(12) United States Patent
More et al.

(10) Patent No.: US 8,220,843 B2
(45) Date of Patent: Jul. 17, 2012

(54) SEALING JOINT FOR CONNECTING ADJOINING DUCT PIECES IN AN ENGINE EXHAUST SYSTEM

(75) Inventors: Dominick G. More, Middletown, CT (US); Jeremy M. Payne, New Haven, CT (US); Kenneth W. Cornett, Ivoryton, CT (US); Paul A. Dudzinski, East Berlin, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 359 days.

(21) Appl. No.: 12/750,293

(22) Filed: Mar. 30, 2010

(65) Prior Publication Data

US 2010/0181765 A1  Jul. 22, 2010

Related U.S. Application Data

(63) Continuation-in-part of application No. 12/499,423, filed on Jul. 8, 2009, now Pat. No. 8,172,274.

(60) Provisional application No. 61/084,752, filed on Jul. 30, 2008, provisional application No. 61/233,511, filed on Aug. 13, 2009, provisional application No. 61/233,670, filed on Aug. 13, 2009.

(51) Int. Cl.
*F16L 25/00* (2006.01)

(52) U.S. Cl. .................. 285/381.1; 285/298; 285/381.2; 285/146.3

(58) Field of Classification Search .................. 285/298, 285/381.1, 382.4, 382.5, 338, 346, 381.2, 285/381.3, 233, 146.3, 302, 300, 422
See application file for complete search history.

(56) References Cited

U.S. PATENT DOCUMENTS

| | | | |
|---|---|---|---|
| 3,098,662 A * | 7/1963 | Iversen | ......................... 285/242 |
| 3,579,805 A | 5/1971 | Kast | |
| 3,689,114 A | 9/1972 | Meserole | |
| 3,930,071 A | 12/1975 | Rao et al. | |
| 4,097,071 A | 6/1978 | Crawford et al. | |
| 4,198,081 A | 4/1980 | Harrison et al. | |
| 4,209,177 A | 6/1980 | Hall | |

(Continued)

FOREIGN PATENT DOCUMENTS

GB       2 083 154       3/1982

(Continued)

OTHER PUBLICATIONS

European Search Report for corresponding application No. EP 09165847.6 dated May 11, 2009.

(Continued)

*Primary Examiner* — David E Bochna
(74) *Attorney, Agent, or Firm* — Renner, Otto, Boisselle & Sklar, LLP

(57) ABSTRACT

An engine exhaust system comprises duct pieces and a thermally expandable sealing joint for interconnecting their adjoining ends. The sealing joint comprises a tubular body including a first axial end portion, a second axial end portion, and a bridge portion extending therebetween. The first end portion is at least partially positioned within a female recess of the first duct piece and the second end portion is at least partially positioned with a female recess of the second duct piece. The bridge portion can extend across a gap and/or it can be positioned partially within female recesses. Upon thermal activation, the sealing joint radially expands permanently to engage the inner radial surfaces of the duct pieces.

20 Claims, 6 Drawing Sheets

U.S. PATENT DOCUMENTS

| | | |
|---|---|---|
| 4,218,067 A | 8/1980 | Halling |
| 4,281,841 A | 8/1981 | Kim et al. |
| 4,518,444 A * | 5/1985 | Albrecht et al. |
| 4,537,406 A | 8/1985 | Hirasuna et al. |
| 4,553,775 A | 11/1985 | Halling |
| 4,644,747 A | 2/1987 | Petersen |
| 4,747,624 A | 5/1988 | Faber et al. |
| 4,832,382 A | 5/1989 | Kapgan |
| 4,871,181 A | 10/1989 | Usher et al. |
| 4,872,713 A | 10/1989 | Kapgan |
| 5,062,667 A | 11/1991 | Miller et al. |
| 5,150,931 A | 9/1992 | Hagio et al. |
| 5,174,616 A | 12/1992 | Hagio et al. |
| 5,265,919 A | 11/1993 | Takemoto et al. |
| 5,462,291 A | 10/1995 | Maeda et al. |
| 5,687,995 A | 11/1997 | Mori et al. |
| 5,772,254 A | 6/1998 | Felber et al. |
| 6,109,662 A | 8/2000 | van Zuthem et al. |
| 6,129,362 A | 10/2000 | Kahima et al. |
| 6,152,453 A | 11/2000 | Kashima et al. |
| 6,186,123 B1 | 2/2001 | Maier et al. |
| 6,220,605 B1 | 4/2001 | Becker, Jr. |
| 6,293,098 B1 | 9/2001 | Coates |
| 6,302,402 B1 | 10/2001 | Rynders et al. |
| 6,517,086 B1 | 2/2003 | Jamrog |
| 6,637,110 B2 * | 10/2003 | Jee .......................... 285/381.1 |
| 6,672,594 B2 | 1/2004 | Kozerski |
| 6,709,023 B2 | 3/2004 | French |
| 6,860,487 B2 | 3/2005 | Shiokawa et al. |
| 6,988,681 B2 | 1/2006 | Reiter |
| 7,063,330 B2 | 6/2006 | Kubota et al. |
| 7,172,202 B2 | 2/2007 | Kubota et al. |
| 7,328,685 B2 | 2/2008 | Mockenhaupt et al. |
| 7,503,594 B2 * | 3/2009 | Peacock et al. ............ 285/381.1 |
| 7,556,295 B2 | 7/2009 | Holzheu |
| 8,172,274 B2 * | 5/2012 | More et al. .................... 285/302 |
| 2006/0272321 A1 | 12/2006 | Mockenhaupt et al. |
| 2007/0240409 A1 | 10/2007 | Bassani |
| 2007/0252335 A1 | 11/2007 | Breen |
| 2007/0257443 A1 | 11/2007 | Kubota et al. |
| 2007/0284828 A1 | 12/2007 | Komukai et al. |
| 2008/0017269 A1 | 1/2008 | Gudenburr et al. |
| 2008/0079222 A1 | 4/2008 | Namuduri et al. |
| 2008/0136180 A1 | 6/2008 | Dittmar |
| 2008/0289323 A1 | 11/2008 | Diez et al. |
| 2010/0006303 A1 | 1/2010 | Garcia et al. |
| 2010/0028075 A1 | 2/2010 | More et al. |

FOREIGN PATENT DOCUMENTS

| | | |
|---|---|---|
| GB | 2 138 904 | 10/1984 |
| JP | 363172064 | 7/1988 |
| JP | 2005127391 | 5/2005 |

OTHER PUBLICATIONS

Extended European Search Report for corresponding application No. EP 10159566.8 dated Jul. 21, 2010.

Partial European Search Report for corresponding application No. EP 10159566.8 dated May 12, 2010.

* cited by examiner

US 8,220,843 B2

SEALING JOINT FOR CONNECTING ADJOINING DUCT PIECES IN AN ENGINE EXHAUST SYSTEM

RELATED APPLICATIONS

This application is a continuation-in-part of U.S. patent application Ser. No. 12/499,423 filed Jul. 8, 2009, now U.S. Pat. No. 8,172,274 issued May 8, 2012, which claims priority under 35 U.S.C. §119 (e) to U.S. Provisional Patent Application No. 61/084,752 filed on Jul. 30, 2008. This application also claims priority under 35 U.S.C. §119 (e) to U.S. Provisional Patent Application Nos. 61/233,511 filed on Aug. 13, 2009, and 61/233,670 filed on Aug. 13, 2009.

BACKGROUND

An engine exhaust system typically comprises ductwork with a plurality of duct pieces that are connected together to form conveyance passages for exhaust gasses. For example, a duct piece can be fixed to the exhaust manifold head (and aligned with one or more exhaust ports) and connected to other duct pieces to convey exhaust gas to a vehicle's outlet pipe. If the engine includes an EGR (i.e., exhaust gas recirculation) design, duct pieces can be interconnected to convey exhaust gas back into the air intake line for reintroduction into the combustion chamber. Such a multi-piece construction of the ductwork allows the engine exhaust system to accommodate the thermal expansion-contraction that occurs during engine warm-up, operation, and/or cool-down.

Diesel engine manufacturers conventionally use piston ring type seals in exhaust system applications. The piston ring seals allow for significant relative motion and movement for the exhaust manifold components to thermally expand. However, piston rings are not continuous seals. Piston rings have a cut in them to allow flexibility in the hoop direction. This gap provides a leak path for exhaust gas to leak out of the exhaust system. This leaked exhaust bypasses the catalytic converter, exhaust gas recirculation, and/or particle collection components. As exhaust emissions get tighter and tighter, these small exhaust leaks need to be prevented and all exhaust gas needs to be collected and treated through the exhaust system.

SUMMARY

Improved sealing effectiveness of exhaust components and sub-components is required to meet Euro VI emission standards scheduled to take effect in January 2013. A sealing joint is provided for interconnecting duct pieces in an engine exhaust system. The sealing joint is adapted to accommodate a female-to-female interconnection between duct pieces and it has a continuous circumferential construction. Accordingly, there are no inherent leak paths through which exhaust gas can escape upstream of emission-control devices (e.g., catalytic converter, particle collector, etc.). The sealing joint of the present invention can provide improved sealing through increased contact load, improved wear resistance and simplified installation by incorporating an expand-in place "thermally activated" construction.

The thermally activated sealing joint described and claimed herein offers the advantage of ease of installation in high temperature applications such as coupling diesel exhaust manifold sections. The sealing joint can be installed with a clearance fit, therefore requiring little to no installation force. In one embodiment, it derives this advantage through the novel use of a material with a high level of thermal expansion to generate a hydrostatic pressure. This pressure causes specific areas of the sealing joint to permanently expand and seal against the cavity into which it has been installed.

In a first aspect of the invention, there is provided a thermally expandable sealing joint including a one-piece tubular body having an outer surface; the tubular body having a first axial end portion, a second axial end portion, and a bridge portion extending therebetween; the first end portion having a coaxially convex outer profile with a maximum outer diameter ($OD_{1max}$); the second end portion having a coaxially convex outer profile with a maximum outer diameter ($OD_{2max}$); and the bridge portion having a coaxially concave outer profile with a minimum outer diameter ($OD_{Bmin}$), this minimum outer diameter ($OD_{Bmin}$) being less than the maximum outer diameter ($OD_{1max}$) of the first end portion and less than the maximum outer diameter ($OD_{2max}$) of the second end portion; wherein the maximum outer diameter ($OD_{1max}$) of the first end portion and the maximum outer diameter ($OD_{2max}$) of the second end portion increases substantially irreversibly upon heating the sealing joint.

The tubular body of the sealing joint may be constructed of a precipitation hardening alloy. Examples of such precipitation hardening alloys include stainless steel commonly known as 17-7 PH, PH 15-7 Mo, PH 14-8 Mo, AM-350 and AM-355. The tubular body may include a wear-resistant coating on its outer surface.

In another aspect of the invention, there is provided a thermally expandable sealing joint that includes a tubular body having a rigid inner sleeve and a flexible outer sleeve joined to the inner sleeve, the tubular body extending along a longitudinal axis and having a first end portion and a second end portion and a bridge portion extending between the first end portion and the second end portion; a first annular chamber between the inner and outer sleeves in the first end portion and a second annular chamber between the inner and outer sleeves in the second end portion; a thermally expandable material contained independently within the first annular chamber and the second annular chamber, wherein upon being heated within the chamber, the thermally expandable material expands to effect a radially outward, permanent deformation of the outer sleeve in the first end portion and the second end portion.

The rigid inner sleeve and flexible outer sleeve may each be formed of a metal or metal alloy. The metal or metal alloy of the inner sleeve may be the same as or different from the metal or metal alloy of the outer sleeve. In one embodiment, the thickness of the inner sleeve is greater than the thickness of the outer sleeve.

The thermally expandable material may be a liquid or a solid. For example, the liquid may be water or ethanol or a mixture thereof. The solid may be a metal or metal alloy. Alternatively, the thermally expandable material may include an ultra high molecular weight polyethylene or other polymeric material.

In a further aspect of the invention, there is provided ductwork that includes a first duct piece, a second duct piece, and the sealing joint interconnecting adjoining ends of the first duct piece and the second duct piece; wherein: the first duct piece includes a passage for conveying fluid gas and a female recess, coextensive with the passage, on its adjoining end; the second duct piece includes a passage for conveying combustion gas and a female recess, coextensive with the passage on its adjoining end; the first end portion of the tubular body is at least partially positioned within the female recess of the first duct piece; the second end portion of the tubular body is at least partially positioned with the female recess of the second duct piece; and the bridge portion of the tubular body extends across a gap between the adjoining ends of the duct pieces and/or is positioned partially within the female recesses.

In yet a further aspect of the invention, there is an engine exhaust system that includes the ductwork, wherein combustion gas passes through the passage in the first duct piece, through the passage in the tubular body of the sealing joint, and through the passage in the second duct piece.

The foregoing and other features of the invention are hereinafter described in greater detail with reference to the accompanying drawings.

DRAWINGS

Figure 6A:
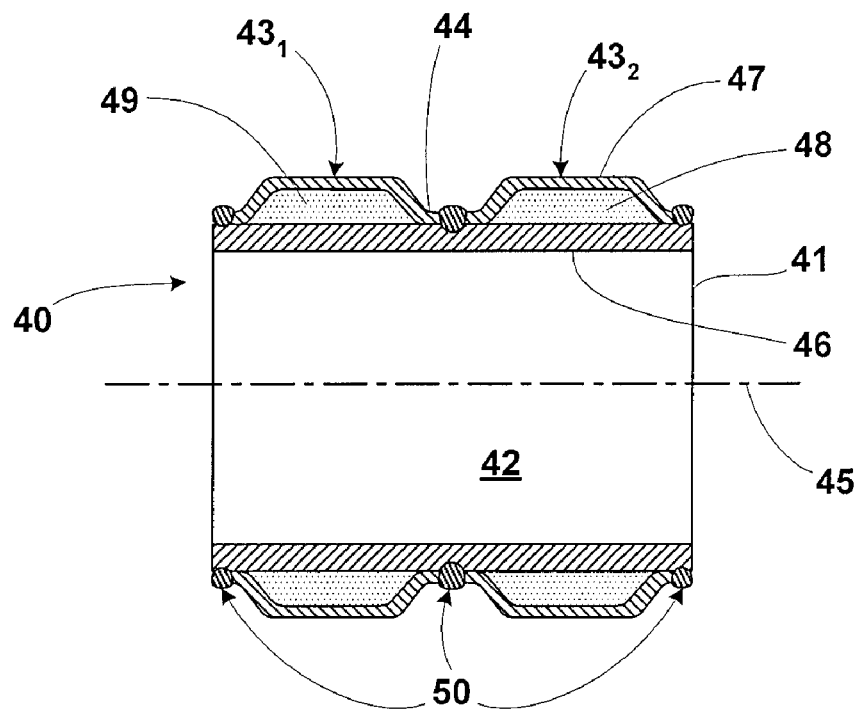
Figure 6B:
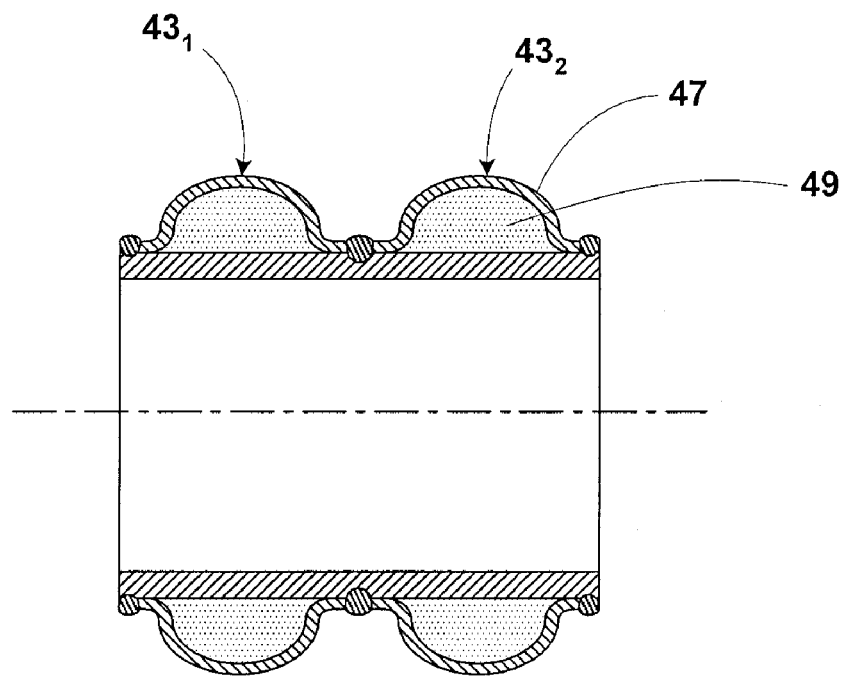

FIGS. 6(a) and 6(b) are sectional views of an embodiment of the sealing joint having an expandable annular chamber before and after thermal expansion, respectively.

Figure 7A:
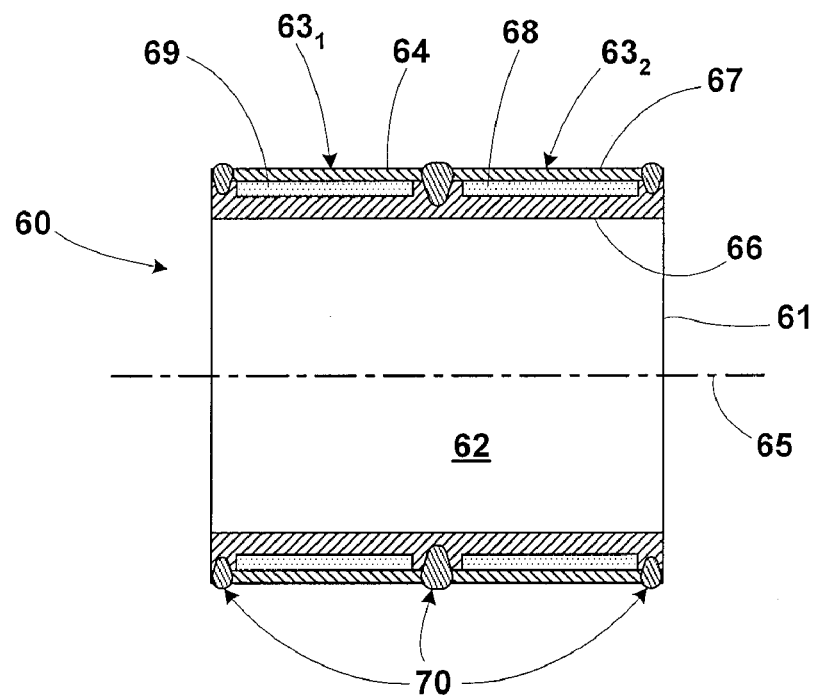
Figure 7B:
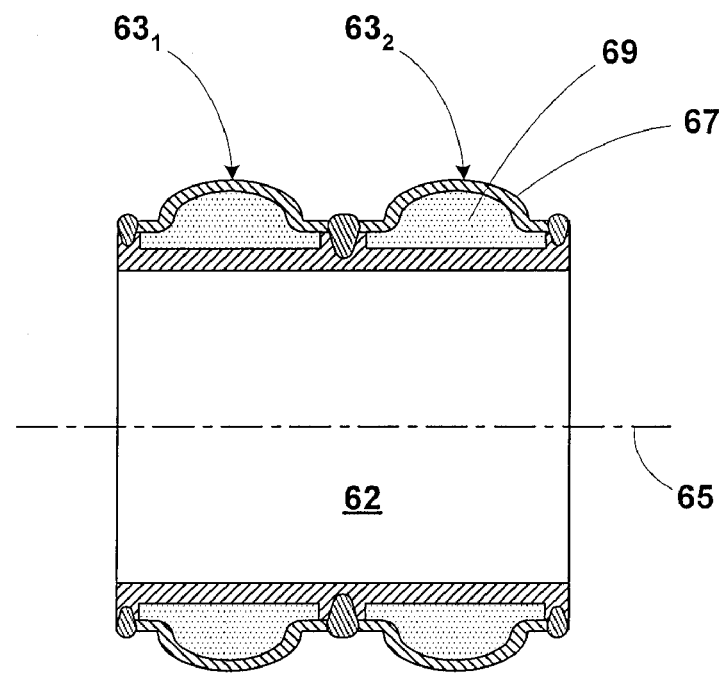

FIGS. 7(a) and 7(b) are sectional views of an embodiment of the sealing joint having an expandable annular channel before and after thermal expansion, respectively.

DESCRIPTION

Figure 1:
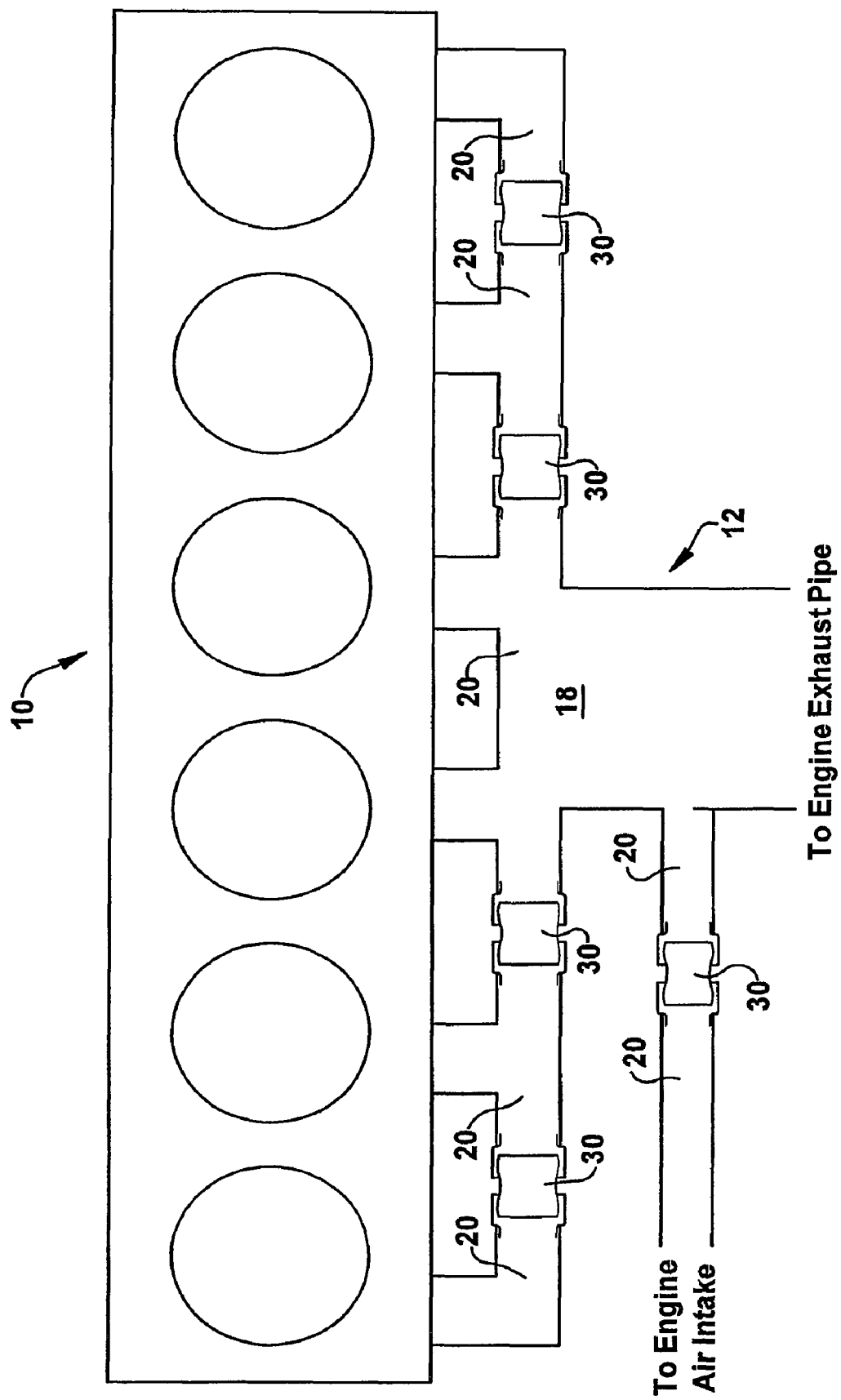
FIG. 1 is a schematic drawing of an engine incorporating the sealing joint in its ductwork.

Referring now in detail to the drawings and initially to FIG. 1, an exemplary engine 10 (e.g., a six-cylinder diesel engine) is shown schematically. The engine 10 includes an exhaust system 12 comprising ductwork 18 with a plurality of duct pieces 20 that are connected together to form conveyance passages for exhaust gasses. For example, a plurality of the duct pieces 20 can be interconnected to form an exhaust manifold head that discharges to an exit passage to convey exhaust combustion gas to a vehicle's exhaust pipe. If the engine 10 includes an EGR (i.e., exhaust gas recirculation) design, certain duct pieces 20 can be interconnected to convey a portion of the exhaust gas back to the engine's air intake.

Adjoining duct pieces 20 in the engine exhaust system 12 are interconnected by sealing joints 30. The multi-piece construction of the ductwork, and the interconnection of the duct pieces 20 by the sealing joints 30, allows the exhaust system 12 to accommodate the thermal expansion-contraction that occurs during engine warm-up, operation, and/or cool-down. The sealing joints 30 compensate for movement of the duct pieces towards and away from each other during heating and cooling, without compromising any sealing capacity.

Figure 2:
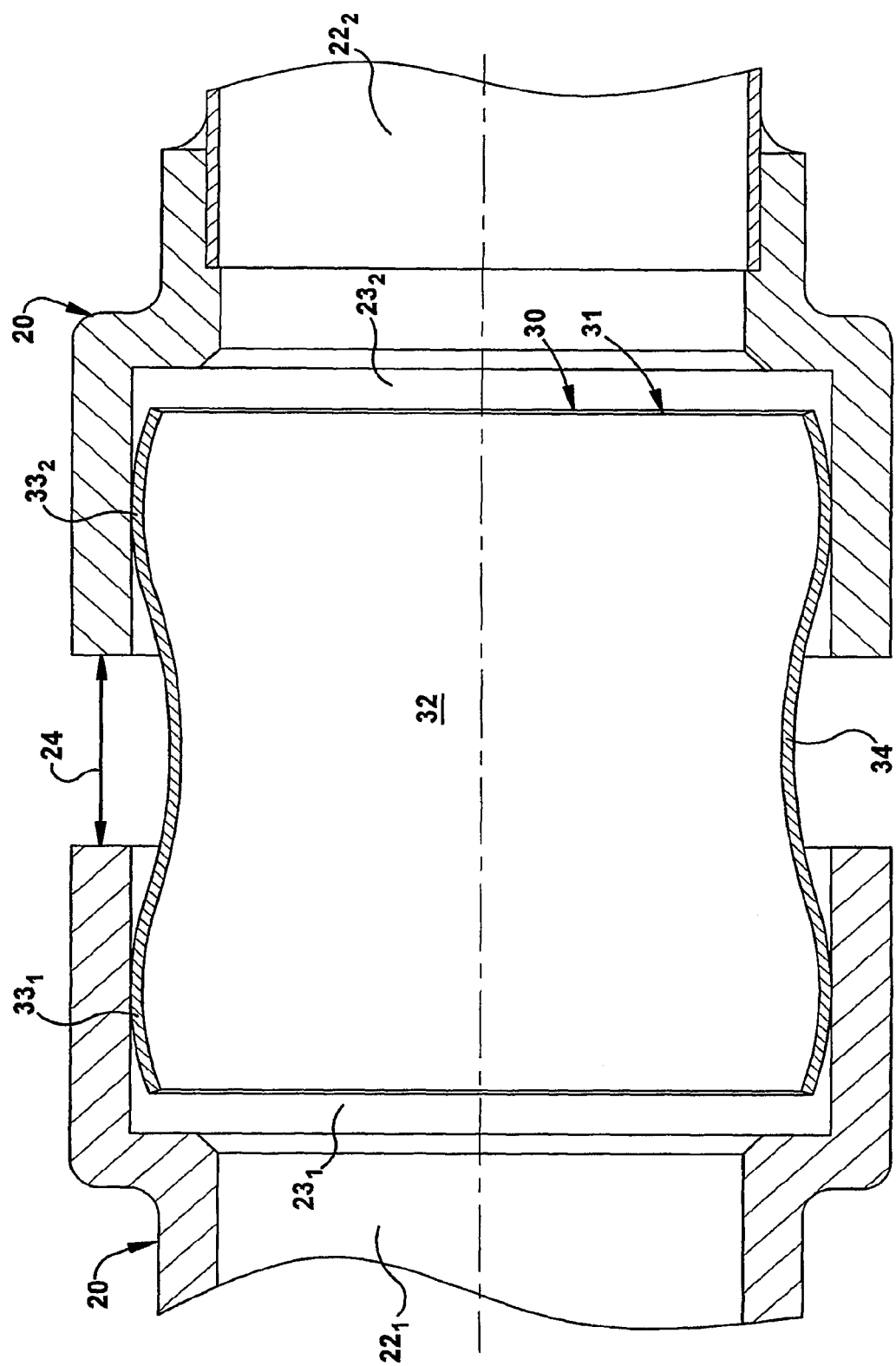
FIG. 2 is a sectional view of a first embodiment of the sealing joint and the adjoining ends of the duct pieces interconnected thereby.

Referring now to FIG. 2, adjoining duct pieces 20 and their interconnecting sealing joint 30 are shown in more detail. The first duct piece $20_1$ includes a passage $22_1$ for conveying combustion gas and a female recess $23_1$, coextensive with the passage $22_1$, on its adjoining end. The second duct piece $20_2$, includes a passage $22_2$ for conveying combustion gas and a female recess $23_2$, coextensive with the passage $22_2$, on its adjoining end. The axial end faces of the adjoining duct pieces 20 create a female-to-female connection arrangement with the duct pieces 20 separated by a gap 24 that lengthens/shortens during thermal expansion/contraction of engine parts.

In one embodiment, the sealing joint 30 comprises a one-piece tubular body 31 having a passage 32 extending axially therethrough. The sealing joint 32 includes a first axial end portion $33_1$, a second axial end portion $33_2$ and a bridge portion 34 extending therebetween. The first end portion $33_1$ is at least partially positioned within the female recess $23_1$ of the first duct piece $20_1$ and the second end portion $33_2$ is at least partially positioned with the female recess $23_2$ of the second duct piece $20_2$. The bridge portion 34 extends across the gap 24 and/or is positioned partially within female recesses $23_1$ and $23_2$, depending upon the engine's thermal conditions.

In the engine exhaust system 12, combustion gas passes through the passage $22_1$ of the first duct piece $20_1$, through the passage 32 in the sealing joint 30, and then through the passage $22_2$ of the second duct piece $20_2$. The sealing joint 30 does not have interruptions in its circumferential surfaces (as opposed to, for example, a sealing joint comprising a slip ring). Accordingly, there are no inherent leak paths through which exhaust gas can escape upstream of emission-control devices (e.g., catalytic converter, particle collector, etc.).

Figure 3:
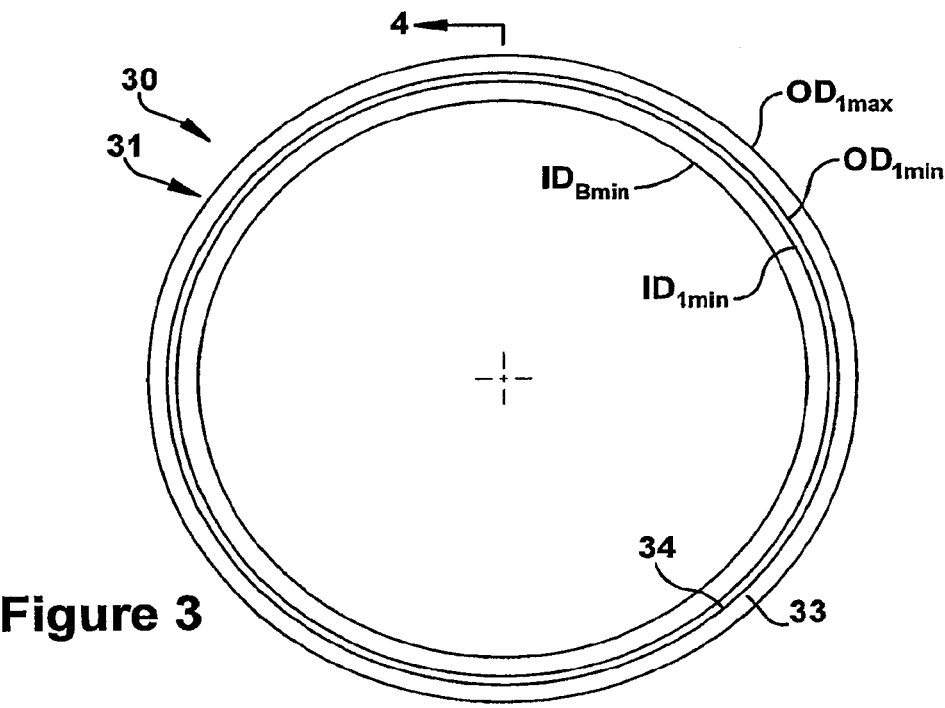
FIG. 3 is a front axial view of the first embodiment of sealing joint isolated from the duct pieces.
Figure 4:
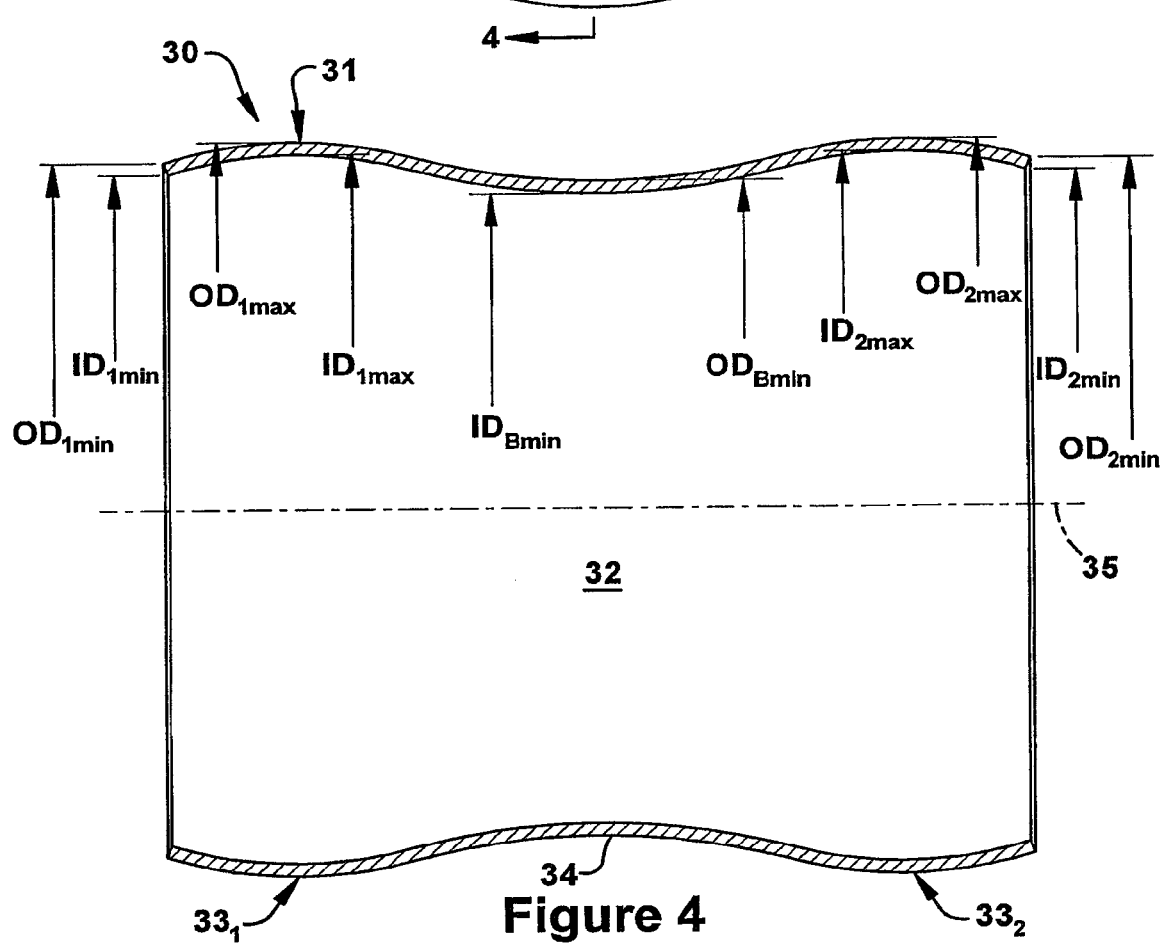
FIG. 4 is a sectional view of the sealing joint as taken along line 4-4 in FIG. 3.

Referring now to FIGS. 3 and 4, the sealing joint 30 is shown isolated from the engine's ductwork 18. The geometry of the tubular body 31 resembles a fat hourglass, with its end portions 33 corresponding to the upper/lower sand bulbs and its bridge portion 34 corresponding to the union therebetween. (The bridge portion 34 is relatively wide when compared to the bottleneck of a conventional hourglass shape.)

The portions $33_1$, $33_2$, and 34 can be coaxially convex and/or concave. In other words, the tubular body 31 can be symmetrical about a series of planes passing through its longitudinal axis 35. An outer surface is "concave" or "convex" as viewed from outside the tubular body 31. An inner surface is "concave" or "convex" as viewed from inside the passage 32.

More particularly, the first end portion $33_1$ has a coaxially convex outer profile with a maximum outer diameter $OD_{1max}$ and a minimum outer diameter $OD_{1min}$, and it has a coaxially concave inner profile with a maximum inner diameter $ID_{1max}$ and a minimum inner diameter $ID_{1min}$. The second end portion $33_2$ has a coaxially convex outer profile with a maximum outer diameter $OD_{2max}$ and a minimum outer diameter $OD_{2min}$, and it has a coaxially concave inner profile with a maximum inner diameter $ID_{2max}$ and minimum inner diameter $ID_{2min}$. The bridge portion 34 has a coaxially concave outer profile with a minimum outer diameter $OD_{Bmin}$ and a coaxially convex inner profile with a minimum inner diameter $ID_{Bmin}$.

The bridge's minimum outer diameter $OD_{Bmin}$ is less than the maximum outer diameter $OD_{1max}$ of the first end portion $33_1$ and it is less than the maximum outer diameter $OD_{2max}$ of the second end portion $33_2$. The bridge's minimum inner diameter $ID_{Bmin}$ can be less than the maximum inner diameter $ID_{1max}$ of the first end portion $33_1$ and/or it can be less than the maximum inner diameter $ID_{2max}$ of the second end portion $33_2$. Alternatively, the bridge's minimum inner diameter $ID_{Bmin}$ can be not less than the maximum inner diameter $ID_{1max}$ of the first end portion $33_1$ and/or it can be not less than the maximum inner diameter $ID_{2max}$ of the second end portion $33_2$.

The tubular body 31 can have a constant thickness throughout its portions $33_1$, $33_2$, 34. If so, the difference between the inner diameters and the difference between the outer diameters will be the substantially the same. In other words, for example, the inner-outer diameter differences ($OD_{1max}$–$ID_{1max}$ and $OD_{1min}$–$ID_{1min}$) of the first end portion $33_1$, the inner-outer diameter differences ($OD_{2max}$–$ID_{2max}$ and $OD_{2min}$–$ID_{2min}$) of the second end portion $33_2$, and the inner-outer diameter difference ($OD_{Bmin}$–$ID_{Bmin}$) of the bridge portion 34 can all be approximately equal.

The maximum outer diameters ($OD_{1max}$ and $OD_{2max}$) of the end portions 33 are each sized to contact the inner wall of the female recess 23 in the respective duct piece 20. (See FIG. 2.) If the recess $23_1$ and the recess $23_2$ are of a similar shape, the end portions 33 can be symmetrical relative to each other about the bridge portion 34. Specifically, for example, the maximum outer diameter $OD_{1max}$ of the first end portion $33_1$ and the maximum outer diameter $OD_{2max}$ of the second end portion $33_2$ can be approximately equal. Likewise, the minimum outer diameter $OD_{1min}$ of the first end portion $33_1$ and the minimum outer diameter $OD_{2min}$ of the second end portion $33_2$ can be approximately equal. And the inner diameters ($ID_{1max}$ and $ID_{1min}$) of the first end portion $33_1$ can be approximately equal to the inner diameters ($ID_{2max}$ and $ID_{2min}$) of the second end portion $33_2$.

In certain ductwork 18 (and/or with some duct pieces 20), the recess $23_1$ and the recess $23_2$ may be of different sizes and/or shapes. If so, the end portions 33 of the sealing joint 30 can be adapted to accommodate the respective recesses 23. With non-similar duct pieces, the end portions 33 may not be symmetrical about the bridge portion 34. (But the portions $33_1$, $33_2$, and 34 can still be coaxially convex-concave and/or symmetrical about a series of planes passing through the longitudinal axis 35 of the tubular body 31.)

The minimum outer diameter $OD_{1min}$ of the first end portion $33_1$ and the minimum outer diameter $OD_{2min}$ of the second end portion $33_2$ can be located near or at the portions' respective distal (i.e., bridge-remote) edges. This geometry may facilitate insertion of the end portion 33 into the female recess 23 of the corresponding duct piece 20.

The tubular body 31 can be made from a metal and/or a metal alloy (e.g., stainless steel, carbon steel, etc.). A cylindrical tube segment (e.g., cut from seamed or seamless tubing) can be machined or cold-formed to acquire the desired hourglass shape. The thickness of the tubular body 31 can depend upon the material from which it is made and expected conditions in which it will be installed. If it is too thin, the body 31 may too easily deformed in the ductwork. If it is too thick, the body 31 may not be able to adequately accommodate axial shifting caused by thermal expansion-contraction. A metal stainless steel tubular body 31, intended for installation in the exhaust system of a typical diesel engine, can have a thickness of between about 0.5 mm and about 1.0 mm, for example.

The tubular body 31 of sealing joint 30 may be thermally expandable. In one embodiment, the metal alloy used to form the tubular body 31 is a precipitation hardening alloy. Precipitation hardening stainless steels contain an added amount of Al, Ti, Cu and/or Mo that forms fine precipitates upon heating the alloy. The formation of precipitates increases the strength of the alloy and results in an irreversible volume expansion of the alloy. There are three types of precipitation hardening stainless steels: martensitic type, austenitic type and semiaustenitic type. The thermally expandable tubular body of this embodiment is preferably made of a semiaustenitic precipitation hardening stainless steel. Examples of such stainless steels include those commonly referred to as 17-7 PH, PH 15-7 Mo, PH 14-8 Mo, AM-350 and AM-355. The compositions (wt %) of these semiaustenitic precipitation hardening stainless steels are shown in Table 1 below. With semiaustenitic precipitation hardening stainless steel, all or most of the structure remains austenitic even after the steel is cooled only by the solution heat treatment. This austenitic structure can be transformed to the martensitic structure by applying an intermediate heat treatment to the steel or by cold working, and the precipitation hardening is capable of being effected by applying a heat treatment to the steel.

TABLE 1

| Common Name (AISI No) | Fe | Cr | Ni | Mo | Al | Mn | Si | C | Other |
|---|---|---|---|---|---|---|---|---|---|
| 17-7 PH (Type 631) | Bal | 16.00 18.00 | 6.50 7.75 | — | 0.75 1.50 | 1.00 max | 1.00 max | 0.09 max | 0.04 max P; 0.04 max S |
| PH 15-7 Mo (Type 632) | Bal | 14.00 16.00 | 6.50 7.75 | 2.00 3.00 | 0.75 1.50 | 1.00 max | 1.00 max | 0.09 max | 0.04 max P; 0.03 max S |
| PH 14-8 Mo | Bal | 13.75 15.00 | 7.75 8.75 | 2.00 3.00 | 0.75 1.50 | 1.00 max | 1.00 max | 0.05 max | 0.015 max P; 0.010 max S |
| AM-350 (Type 633) | Bal | 16.00 17.00 | 4.00 5.00 | 2.50 3.25 | — | 0.50 1.25 | 0.50 max | 0.07 0.11 | 0.07-0.13 N; 0.04 max P; 0.03 max S |
| AM-355 (Type 634) | Bal | 15.00 16.00 | 4.00 5.00 | 2.50 3.25 | — | 0.50 1.25 | 0.50 max | 0.10 0.15 | 0.07-0.13 N; 0.04 max P; 0.03 max S |

The thermally expanding sealing joint offers the advantage of ease of installation in high temperature applications, such as coupling diesel exhaust manifold sections. The sealing joint can be installed with a clearance fit, therefore requiring little to no installation force. It derives this advantage through the novel use of the alloy's thermal expansion properties.

The precipitation hardening alloy sealing joint is in the annealed state during the installation. Once the engine is started, the sealing joint is subjected to hot exhaust gases which heat the sealing joint to a high temperature and change the alloy's structure. Precipitates are formed within the alloy that both harden the alloy and irreversibly expand its volume. Precipitation may result in a growth of about 0.004 in. per inch of diameter (0.004 mm per mm of diameter).

A minimum clearance of about 0.0003 in. (0.0076 mm) may be required between the sealing joint and the manifold in order to assemble the joint with ease. The material growth may be in excess of this minimum and allows the clearance to be considerably larger, while still effectively creating a seal. The extra clearance allows for manufacturing tolerances of both the sealing joint and the mating manifold sections.

The expansion of the sealing joint generates a relatively low level of load and is essentially limited to the size of the mating bore. This low load, along with the generous contact area, keeps the contact stresses low at the sealing surface, which helps minimize wear.

The sealing joint has a broader contact area on the sealing surface. This sealing surface also has no sharp edges and, thus is conducive to being coated with a wear resistant coating. The overall lower contact pressure, at the sealing surface, and the choice of coating, help prevent galling from the movements associated with thermal growth.

Figure 5:
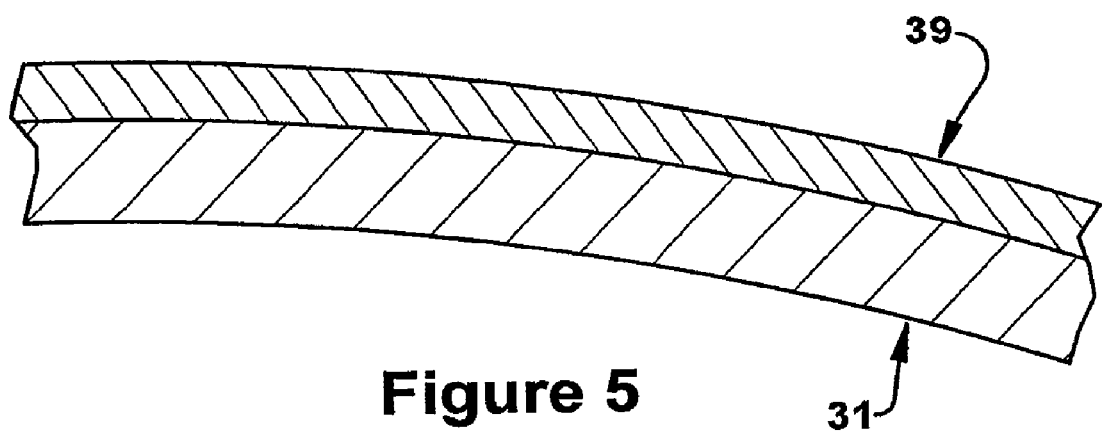
FIG. 5 is a closeup view of the surface of the sealing joint of FIG. 3.

As illustrated in FIG. 5, the tubular body 31 can include a wear-resistant coating 39 on its outer duct-contacting surface. The coating 39 can comprise a matrix phase including a metal or a metal alloy (e.g., cobalt, nickel, tin, zinc, copper, iron, tungsten, or a combination of two or more thereof) and MCrAlY particles dispersed in the matrix (wherein M is chosen from nickel, cobalt, iron, or a combination of two or more thereof). The coating thickness can be from about 25 μm to about 130 μm. Further details of a suitable coating are set forth in U.S. application Ser. No. 12/388,792, the entire disclosure of which is hereby incorporated by reference.

Referring to FIG. 6(a), an embodiment of a thermally expandable sealing joint 40 is illustrated prior to expansion. Tubular body 41 has an hourglass shape and includes passage 42 extending axially therethrough. The tubular body 41 includes an inner sleeve 46 having a cylindrical shape, and outer sleeve 47 configured to form an annular chamber 48 at each of the first end portion $43_1$ and at the second end portion $43_2$. Bridge portion 44 extends between the first end portion $43_1$ and the second end portion $43_2$. The outer sleeve 47 is joined to the inner sleeve 46 by attachments 50. Attachments 50 may be formed, for example, by welding, brazing or by mechanical attachment. Within each annular chamber 48 is contained a high thermal expansion material 49. The flexible outer sleeve 47 is constructed of a thinner gauge of material than the rigid inner sleeve 46, and is plastically deformable. The rigid inner sleeve 46 and flexible outer sleeve 47 may be made of a metal alloy, such as stainless steel or nickel alloy. The inner and outer sleeves may be made of the same alloy or different alloys.

The sealing joint 40 is positioned so that first end portion $43_1$ is a least partially within the female recess of the first duct piece, and the second end portion is at least partially within the recess of the second duct piece. (See the duct pieces 20 shown in FIG. 2.) Once the engine is started, the sealing joint 40 is subjected to hot exhaust gases which heat the sealing joint to a high temperature and cause the high thermal expansion material 49 to expand. As illustrated in FIG. 6(b), as the high thermal expansion material 49 expands, the thin flexible outer sleeve 47 is plastically deformed. Sealing joint 40 expands radially from axis 45 at both first end portion $43_1$ and second end portion $43_2$ to increase the diameter of the sealing joint and effect a seal within the recesses of the duct pieces. The increase in diameter that occurs is due to plastic deformation of the outer sleeve and is permanent. The increase in diameter of the sealing joint generates a relatively low level of load and is essentially limited to the size of the mating bore. This low load, along with the generous contact area, keeps the contact stresses low at the sealing surface, which helps to minimize wear.

In one embodiment, the annular chamber 48 is provided with a vent port to relieve the pressure within the chamber 48 and to prevent the outer sleeve 47 from rupturing. Alternatively or in addition, the deformable outer sleeve 47 is constructed so that it has sufficient thickness to prevent rupture, yet is capable of being plastically deformed.

The high thermal expansion material 49 within the annular chamber 48 may be solid or liquid. The temperature at which the material 49 expands is dependent upon the particular application in which the sealing joint is used. If the sealing joint is used in a relatively low temperature application, a material having a very high coefficient of thermal expansion (CTE) should be chosen. In an automotive exhaust application, an activation temperature, i.e., temperature for causing expansion of the sealing joint, as high as 600° C. would be acceptable. The high thermal expansion material 49 within the chamber 48 may, or may not be vented to prevent excess pressure from causing damage through overexpansion of the outer sleeve 47. In one embodiment, the high thermal expansion material 49 is a solid material and the outer sleeve 47 includes a small pinhole for venting the contents of the chamber 48.

The CTE of the material 49 within the annular chamber 48 must exceed that of the material used for the rigid inner sleeve 46 and the flexible outer sleeve 47, and of the material used to construct the hardware, e.g., duct pieces, into which the sealing joint is positioned. For example, the inner and outer sleeves may be constructed of stainless steel with an estimated CTE of $17 \times 10^{-3}$ m/m·K or nickel alloy 718 with an estimated CTE of $12 \times 10^{-3}$ m/m·K. The hardware may be constructed of cast iron having an approximate CTE of $12 \times 10^{-3}$ m/m·K.

The CTE of suitable high thermal expansion materials may be expressed by the following equation:

$$\alpha_{min} = \alpha_1 + \frac{2.53 \times 10^{-6}}{T_a - 23}$$

where $\alpha_{min}$ is the minimum required linear CTE of the high thermal expansion material in m/m·K;

$\alpha_1$ is the greater of the linear CTE's of the outer sleeve and the hardware; and $T_a$ is the temperature (° C.) at which the seal must activate.

In one embodiment, the criteria for determining whether an acceptable seal is formed is a minimum expansion of 0.00253 units per unit size interference. As an example, to meet the criteria, for a one inch diameter duct, the sealing joint must be capable of expanding to a minimum of 1.00253 inches to form an acceptable seal. For a two-inch diameter duct, the sealing joint must be capable of expanding to a minimum of 2.0051 inches. By using a thermal expansion material having a CTE greater than $\alpha_{min}$, an even more robust seal can be obtained.

Examples of suitable liquid high thermal expansion materials include water, ethanol, and mixtures of water and ethanol. Due to the flammability of ethanol, mixtures of water and ethanol are preferred over the use of straight ethanol. Examples of suitable solid high thermal expansion materials include metals and metal alloys, and polymeric materials. Aluminum and magnesium and their alloys are particular examples of solid high CTE materials. Polyethylene is an example of a suitable polymeric material having a high CTE. An ultra high molecular weight polyethylene commercially available from Ticona under the trade name GUR® is one example of a useful solid material.

Referring to FIG. 7(a), a further embodiment of a thermally expandable sealing joint is illustrated. Thermally expandable sealing joint 60 is shown prior to expansion. Tubular body 61 has a cylindrical shape and includes passage 62 extending axially therethrough. The tubular body 61 includes an inner sleeve 66 having a cylindrical shape, and outer sleeve 67 joined to inner sleeve 66. Annular channels 68 are formed in inner sleeve 66 at each of the first end portion $63_1$ and at the second end portion $63_2$. For example, annular channels 68 may be cut or machined into the outer surface of inner sleeve 66. Bridge portion 64 extends between the first end portion $63_1$ and the second end portion $63_2$. The outer sleeve 67 is joined to the inner sleeve 66 by attachments 70 at the bridge portion 64 between channels 68 and at each end portion $63_1$ and $63_2$ adjacent the outermost edge of the channels 68. Attachments 70 may be formed, for example, by welding, brazing or by mechanical attachment. Within each annular channel 68 is contained a high thermal expansion material 69. Outer sleeve 67 is constructed of a thinner gauge of material than inner sleeve 66.

The sealing joint 60 is positioned so that first end portion $63_1$ is a least partially within the female recess of the first duct piece, and the second end portion is at least partially within the recess of the second duct piece. Thermal activation occurs when the sealing joint 60 is subjected to hot exhaust gases. As illustrated in FIG. 7(*b*), as the high expansion material 69 expands, the thin flexible outer sleeve 67 is plastically deformed. Sealing joint 60 expands radially from axis 65 at both first end portion $63_1$ and second end portion $63_2$ so that sealing joint 60 assumes an hourglass shape to effect a seal within the recesses of the duct pieces. Deformation of the outer sleeve 67 is permanent.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A thermally expandable sealing joint comprising a one-piece tubular body having an outer surface;
   the tubular body having a first axial end portion, a second axial end portion, and a bridge portion extending therebetween;
   the first end portion having a coaxially convex outer profile with a maximum outer diameter ($OD_{1max}$);
   the second end portion having a coaxially convex outer profile with a maximum outer diameter ($OD_{2max}$); and
   the bridge portion having a coaxially concave outer profile with a minimum outer diameter ($OD_{Bmin}$), this minimum outer diameter ($OD_{Bmin}$) being less than the maximum outer diameter ($OD_{1max}$) of the first end portion and less than the maximum outer diameter ($OD_{2max}$) of the second end portion;
   wherein the maximum outer diameter ($OD_{1max}$) of the first end portion and the maximum outer diameter ($OD_{2max}$) of the second end portion increases substantially irreversibly upon heating the sealing joint.

2. A sealing joint as set forth in claim 1, wherein the first end portion has a coaxially concave inner profile with a maximum inner diameter of ($ID_{1max}$);
   wherein the second end portion has a coaxially concave inner profile with a maximum inner diameter of ($ID_{2max}$); and
   wherein the bridge portion has a convex inner profile with a minimum inner diameter ($ID_{Bmin}$), this inner diameter ($ID_{Bmin}$) being less than the maximum inner diameter ($ID_{1max}$) and less than the maximum inner diameter ($ID_{2max}$).

3. The sealing joint of claim 1 wherein the tubular body comprises a precipitation hardening alloy.

4. The sealing joint of claim 1 wherein the precipitation hardening alloy is a stainless steel selected from 17-7 PH, PH 15-7 Mo, PH 14-8 Mo, AM-350 and AM-355.

5. The sealing joint of claim 1 wherein the tubular body includes a wear-resistant coating on its outer surface.

6. The sealing joint of claim 5 wherein the wear-resistant coating comprises:
   a matrix phase comprising a metal or metal alloy; and
   a reinforcing phase comprising particles of an alloy having the formula MCrAlY wherein M is a metal or metal alloy, Cr is chromium, Al is aluminum and Y is yttrium.

7. Ductwork comprising a first duct piece, a second duct piece, and the sealing joint set forth in claim 1 interconnecting adjoining ends of the first duct piece and the second duct piece; wherein:
   the first duct piece includes a passage for conveying fluid gas and a female recess, coextensive with the passage, on its adjoining end;
   the second duct piece includes a passage for conveying combustion gas and a female recess, coextensive with the passage on its adjoining end;
   the first end portion of the tubular body is at least partially positioned within the female recess of the first duct piece;
   the second end portion of the tubular body is at least partially positioned with the female recess of the second duct piece; and
   the bridge portion of the tubular body extends across a gap between the adjoining ends of the duct pieces and/or is positioned partially within the female recesses.

8. An engine exhaust system comprising the ductwork set forth in claim 7, wherein combustion gas passes through the passage in the first duct piece, through the passage in the tubular body of the sealing joint, and through the passage in the second duct piece.

9. A thermally expandable sealing joint comprising:
   a tubular body comprising a rigid inner sleeve and a flexible outer sleeve joined to the inner sleeve, the tubular body extending along a longitudinal axis and having a first end portion and a second end portion and a bridge portion extending between the first end portion and the second end portion;
   a first annular chamber between the inner and outer sleeves in the first end portion and a second annular chamber between the inner and outer sleeves in the second end portion;
   a thermally expandable material contained independently within the first annular chamber and the second annular chamber, wherein upon being heated within the chamber, the thermally expandable material expands to effect a radially outward, permanent deformation of the outer sleeve in the first end portion and the second end portion.

10. The sealing joint of claim 9 wherein the inner sleeve and outer sleeve are each formed independently of a metal or metal alloy.

11. The sealing joint of claim 9 wherein the thermally expandable material comprises a liquid.

12. The sealing joint of claim 9 wherein the thermally expandable material comprises a metal or metal alloy.

13. The sealing joint of claim 9 wherein the thermally expandable material comprises a polymeric material.

14. The sealing joint of claim 9 wherein the tubular body is cylindrically shaped.

15. The sealing joint of claim 9 wherein the first end portion and the second end portion each have an outer diameter that is greater than the outer diameter of the bridge portion.

16. The sealing joint of claim 9 wherein the first end portion and the second end portion each have an outer diameter that is substantially equal to the outer diameter of the bridge portion.

17. The sealing joint of claim 9 wherein the thickness of the inner sleeve is greater than the thickness of the outer sleeve.

18. The sealing joint of claim 9 wherein further comprising a wear resistant coating on the surface of the outer sleeve.

19. Ductwork comprising a first duct piece, a second duct piece, and the sealing joint set forth in claim 9 interconnecting adjoining ends of the first duct piece and the second duct piece; wherein:
 the first duct piece includes a passage for conveying fluid gas and a female recess, coextensive with the passage, on its adjoining end;
 the second duct piece includes a passage for conveying combustion gas and a female recess, coextensive with the passage on its adjoining end;
 the first end portion of the tubular body is at least partially positioned within the female recess of the first duct piece;
 the second end portion of the tubular body is at least partially positioned with the female recess of the second duct piece; and
 the bridge portion of the tubular body extends across a gap between the adjoining ends of the duct pieces and/or is positioned partially within the female recesses.

20. An engine exhaust system comprising the ductwork set forth in claim 19, wherein combustion gas passes through the passage in the first duct piece, through the passage in the tubular body of the sealing joint, and through the passage in the second duct piece.

* * * * *